UNITED STATES PATENT OFFICE.

JOHN PRESTON FOSTER, OF PAIA, TERRITORY OF HAWAII.

COMPOSITE MOTOR-FUEL.

1,384,946.  Specification of Letters Patent.  Patented July 19, 1921.

No Drawing.  Application filed November 29, 1920.  Serial No. 426,987.

*To all whom it may concern:*

Be it known that I, JOHN P. FOSTER, a citizen of the United States, residing at and whose post-office address is Paia, Island of Maui, Territory of Hawaii, have invented certain new and useful Improvements in Composite Motor-Fuel; and I do hereby declare the following to be a full, clear, and exact description of the invention, such as will enable others skilled in the art to which it appertains to make and use the same.

The invention relates to a fuel for internal combustion engines and has for its object to provide a novel composite fuel including alcohol and ether, with preferably a small quantity of kerosene, and a suitable reagent, that will be effective, first in stabilizing the ether constituent and preventing the cyclical reactions which normally occur in commercial ether, and which have been productive not only of loses in the fuel value of the admixture, due to the chemical changes in the ether, but also of deleterious acid reactions resulting from the products of the chemical decomposition of the ether, to the serious impairment of the storage and conducting apparatus for the fuel as well as the engine parts; and, second, in neutralizing the products resulting from the combustion of the fuel in the engine, said products including highly acid compounds resulting from the decomposition of the alcohol and which strongly attack the metallic elements of the engine, unless the acidity of such products is completely neutralized. I have discovered that the basic amido derivative of the aromatic hydrocarbon series, known to the trade as anilin, and to chemists as phenyl-amin, or amino-benzene, having the chemical formula $C_6H_5NH_2$, when admixed in suitable proportion with a composite fuel consisting of alcohol and ether, and preferably a small portion of kerosene, will be absolutely effective not only in stabilizing the ether constituent of the mixture and neutralizing any acid reaction of the fuel prior to ignition, but also in neutralizing the acid reaction of the products of combustion resulting from the explosion of the mixture in the engine, so that the engine parts will not be attacked by the products of combustion, as would be the case if the acid products of the decomposition of the alcohol were not completely neutralized.

It has long been recognized that the explosive combustion of ethyl alcohol, either alone or in combination with ethyl ether, gives rise to certain decomposition products which are actively destructive to the metallic parts of the engine, and in order to minimize and prevent such destructive action it has been proposed to use certain reagents admixed with the fuel which will neutralize or destroy the corrosive products of explosive combustion in the engine cylinders. Among the various reagents heretofore employed are ammonia, pyridin, methyl and ethyl amins. To accomplish this result alone, it is only necessary to employ a chemical reagent of the character indicated, which will function as described and which itself, or in its combinations, will be readily and completely expelled from the engine cylinders along with the products of combustion. What has not been previously recognized, and consequently not heretofore provided for, is the fact that in fuel mixtures of alcohol and ether there is a continual chemical decomposition taking place by oxidation, from the time the fuel is made until it is ultimately consumed. The pre-explosive combustion is chemically identical with the explosive combustion, in so far as the ether is concerned, and the combustion products are substantially identical and therefore equally corrosive. Not only does the formation of these corrosive compounds begin simultaneously with the manufacture of the fuel, but, in consequence of this pre-explosive combination or oxidation, the efficiency of the fuel is destroyed, in direct ratio to the destruction or chemical change of one or more of the components of the fuel. The corrosive products of explosive combustion of the fuel in the engine are the unavoidable result of useful work performed, while the corrosive products of pre-explosive combustion, and the deterioration of the fuel, are the avoidable result of an unnecessary and undesirable combustion or oxidation of the fuel, accomplishing no useful work.

It is, therefore, obvious that the production of a successful synthetic fuel for internal combustion engines involves not only the problem of protecting the engine from the products of combustion, but the far more important and involved problem of protecting the fuel itself from destructive action and the fuel storage and supply system from the deleterious effects resulting from such auto-destructive action of the fuel.

As indicated, I have found that the addition of proper proportion of anilin, otherwise phenyl-amin, to the composite fuel including alcohol and ether, is wholly effective in preventing all of the deleterious reactions in the fuel mixture, so that the latter may be kept indefinitely without danger of chemical change therein, and is also effective in completely neutralizing the products of combustion, so that the latter do not attack the engine parts, and the added reagent is further of such a character that it is completely expelled from the engine along with the products of combustion. Furthermore, the added reagent in itself is stable, basic in character, combines readily with acids to neutralize the same and form salts which are soluble in alcohol and ether. It is miscible in all proportions with alcohol and ether and has the necessary high boiling point and low freezing point. It is reasonably low in cost and available practically everywhere that the other constituents of the fuel are obtainable.

The relative proportions of alcohol and ether to form the composite motor fuel are obviously variable, according to conditions of climate and the particular character or type of the engine in which it is to be employed. Similarly the quantity of anilin required to effect the desired results in the fuel, both before and after explosive decomposition of the latter, may be varied within reasonable limits. For example, a typical admixture for tropical and sub-tropical climates is ethyl alcohol 63%, ethyl ether 34%, kerosene 2% and amino-benzene or anilin 1%, all by volume. In colder climates the percentage of ether may be largely increased, say to 45% or more, by volume, of the mixture, with a corresponding reduction of the alcohol content. The latter mentioned mixture is found to be well adapted for short stroke, high speed engines having a relatively low compression range, say forty pounds to sixty pounds per square inch, while in an engine of relatively long stroke, low speed and relatively high compression the percentage of ether may and preferably should be materially reduced. The amount of anilin required will vary with the percentage of ether used. Ordinarily one-half of 1%, by volume, of anilin is sufficient to protect the composite fuel from pre-explosive changes, while 1% of anilin will generally be found sufficient to effect the same result and also completely neutralize the acid reaction and render innocuous the products of combustion, due to the explosion of the fuel in the engine. As a general proposition the greater the amount of ether used, the more anilin is required, and conversely, save for use in cold weather and at high altitude, when the amount of anilin may be reduced. Again, in very hot or in very humid weather a relatively larger proportion of anilin should be employed. Again, when the fuel is manufactured for immediate use the proportionate amount of anilin may be less than would be required if the fuel is to be stored for an extended time.

What I claim is:

1. A motor fuel comprising an admixture of alcohol, ether and anilin.

2. A motor fuel comprising an admixture of ethyl alcohol, ethyl ether and anilin.

3. A motor fuel comprising an admixture of alcohol, ether, kerosene and anilin.

4. A motor fuel comprising an admixture of the following compounds in substantially the proportions, by volume, indicated; alcohol 63%, ether 34%, kerosene 2% and anilin 1%.

In testimony whereof I affix my signature.

JOHN PRESTON FOSTER.